(12) United States Patent
Hosaka et al.

(10) Patent No.: US 6,413,347 B1
(45) Date of Patent: Jul. 2, 2002

(54) METHOD AND APPARATUS FOR PRODUCING A FRAME-ATTACHED TRANSPARENT PLATE

(75) Inventors: Yoshio Hosaka, Chiyoda-ku; Nobuyuki Tanaka, Chita-gun; Hideyuki Hashimoto, Aiko-gun; Takanobu Kondou, Chita-gun, all of (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 09/513,312

(22) Filed: Feb. 25, 2000

Related U.S. Application Data

(63) Continuation-in-part of application No. PCT/JP99/03415, filed on Jun. 25, 1999.

(30) Foreign Application Priority Data

Jun. 26, 1998 (JP) .......................................... 10-180869

(51) Int. Cl.⁷ .............................................. B29C 47/00
(52) U.S. Cl. ......................... 156/245; 425/556; 428/81
(58) Field of Search ........................ 156/245; 425/556; 428/81

(56) References Cited

U.S. PATENT DOCUMENTS

| | | | |
|---|---|---|---|
| 4,364,895 A | * 12/1982 | Underwood | ................ 425/556 |
| 5,158,638 A | * 10/1992 | Osanami et al. | ............ 156/245 |
| 5,331,784 A | 7/1994 | Agrawal et al. | |
| 5,440,849 A | 8/1995 | Agrawal et al. | |
| 5,443,673 A | 8/1995 | Fisher et al. | |
| 5,475,956 A | 12/1995 | Agrawal et al. | |
| 5,544,458 A | 8/1996 | Fisher et al. | |
| 5,591,528 A | 1/1997 | Fisher et al. | |
| 5,611,180 A | 3/1997 | Agrawal et al. | |
| 5,614,051 A | 3/1997 | Fisher et al. | |
| 5,635,281 A | 6/1997 | Agrawal et al. | |
| 5,665,397 A | 9/1997 | Fisher et al. | |
| 5,707,473 A | 1/1998 | Agrawal et al. | |
| 5,772,822 A | * 6/1998 | Dupuy | ...................... 156/245 |
| 5,804,018 A | 9/1998 | Fisher et al. | |
| 5,807,515 A | 9/1998 | Fisher et al. | |
| 5,822,932 A | 10/1998 | Agrawal et al. | |

FOREIGN PATENT DOCUMENTS

| | | |
|---|---|---|
| JP | 54-83075 | 1/1979 |
| JP | 2-108525 | 4/1990 |
| JP | 5-57797 | 3/1993 |

* cited by examiner

*Primary Examiner*—John J. Gallagher
(74) *Attorney, Agent, or Firm*—Oblon, Spivak, McClelland, Maier & Neustadt, P.C.

(57) ABSTRACT

A frame-attached transparent plate is produced by injection-molding a frame in a mold for injection molding, opening the mold, and projecting the frame in an arched form corresponding to a curvature of a glass plate to press the frame to only a surface of a peripheral portion of the glass plate so as to bond the frame to the peripheral portion of the glass plate. With this, the shape in cross section of the frame can optionally be selected even when the glass plate has a curved portion, and problems such as a poor dimensional accuracy, a poor bonding strength, a poor appearance and so on of the frame can be eliminated.

20 Claims, 13 Drawing Sheets

(A)

(B)

(A)

(B)

METHOD AND APPARATUS FOR PRODUCING A FRAME-ATTACHED TRANSPARENT PLATE

This Application is a Continuation-in-Part Application of PCTJ/099/03415, filed June 1999.

BACKGROUND OF THE INVENTION

1. Field of the Invention

The present invention relates to a method for producing a frame-attached transparent plate applied to, for example, a fixed window of an automobile, and an apparatus used for producing such frame-attached transparent plate.

2. Discussion of the Background

A fixed window 30 provided at a side face of an automobile is often formed by fitting a frame-attached glass plate 33 to a recessed opening portion 32 of a body panel in order to form a flush surface in the automobile body and to improve the appearance (FIG. 3).

The frame-attached glass plate 33 comprises a frame 35, called under the name of a gasket, a mole, a molding or the like, attached to a peripheral portion of a rear surface 34A (an inner side of an automobile) of a glass plate 34. The frame-attached glass plate 33 is fixed to the body panel 31 with an adhesive agent 36. On the rear surface 34A of the glass plate 34, a dark-colored coating layer 37 by ceramic coating is provided so that the adhesive agent 36 is not visible from a side of the front surface 34B (an outer side of automobile).

In many cases, the glass plate 14 is bend-shaped in a two-dimensional direction or a three-dimensional direction.

The following methods are used for producing the frame-attached glass plate 33: conventional example 1 is a bonding method where a frame 35 is formed by bonding an elongated extruded material formed by extruding to a glass plate 34 by means of a double-coated tape; and conventional example 2 is a one-piece injection-molding method where a frame 35 is formed by injection-molding resin on a peripheral portion of a glass plate 34 placed in a predetermined mold.

In the conventional example 1, however, the shape in cross section of the frame 35 is constant due to the extruded material, and there is apt to occur a poor appearance derived from a poor dimensional accuracy, a poor bonding strength or a curve in the extruded material. Such poor appearance appears remarkably when a degree of curving in the glass plate is large. In order to eliminate the poor bonding strength in the extruded material, it is considered appropriate to use an adhesive agent such as urethane sealant or the like. However, use of the adhesive agent creates new problems that a post treatment for removing a squeeze of the bonding agent is necessary, and it takes time for the solidification of the bonding agent.

The conventional example 2, although it can eliminate the problems in the conventional example 1, creates a problem in that the cost for manufacturing is high. In particular, it is necessary to increase the accuracy of the shape of the mold in order to place the glass plate in the mold. When the accuracy of the shape of the mold is low, the glass plate is broken at the time of one-piece injection-molding of the frame. Further, in a case of using a curved glass plate, an error in the curved shape takes place in the glass plate. When a degree of curving in the glass plate is large, the error in the curved shape appears remarkably. When the error in the curved shape appears remarkably, the glass plate is broken at the time of one-piece injection-molding of the frame even though the accuracy of the shape of the mold is high.

Further, there is proposed a method for producing a panel for an automobile wherein a gasket main body of substantially annular shape is formed by injection-molding in a mold, the mold is opened, and a glass plate is pushed toward the opened mold to bond the gasket main body to the glass plate (U.S. Pat. No. 5,443,673), which is conventional example 3.

In the conventional example 3, after the gasket main body has been obtained by injection-molding, the glass plate is pushed to the gasket main body in a state that the gasket main body is held in the mold. Accordingly, if the shape of parting surfaces of the mold, after the mold has been opened, does not meet the shape of the glass plate, the glass plate is broken when the glass plate is pushed. On the contrary, a fault of bonding of the gasket main body to the glass plate may occur. In particular, when the gasket main body is provided on only one surface of the glass plate(hereinbelow, the one surface is referred to as a surface), the fault of bonding is serious unlike a case that the gasket main body has the following structure.

Namely, there has been known such a structure that a recessed portion adapted to receive an edge and both faces of the glass plate is formed in the gasket main body, and the gasket main body is attached onto the glass plate in a state that the periphery of the glass plate is inserted in the recessed portion. The presence of the recessed portion in the gasket main body reinforces a holding strength between the gasket main body and the glass plate when the gasket main body is fitted to the glass plate. However, when the gasket main body is provided on only a surface of the glass plate, the holding strength to the both members depends on the bonding of these members. Accordingly, the above-mentioned poor bonding strength appears remarkably as a problem in a case of providing the gasket main body on only a surface of the glass plate.

When the glass plate is bend-shaped, in order to prevent the breakage of the glass plate, it is necessary to form previously parting surfaces of a mold to have a circular arch plane or spherical plane which corresponds to a curved shape of the glass plate, and to determine correctly the relative position of the glass plate and the gasket main body. Accordingly, there are problems that cost for the mold is high and steps for manufacturing are complicated.

SUMMARY OF THE INVENTION

It is an object of the present invention to provide a method for producing a frame-attached transparent plate wherein the shape in cross section of a frame can optionally be selected even when the transparent plate such as a glass plate is bend-shaped; a poor dimensional accuracy, a poor bonding strength and a poor appearance of the frame can be eliminated as well as the cost for the mold can be reduced, and the frame can be provided on a surface of the transparent plate without complicating the steps for manufacturing.

Further, it is another object of the present invention to provide an apparatus used suitably for the method for producing a frame-attached transparent plate.

In order to achieve the above-mentioned objects, the present invention is to provide a method for producing a frame-attached transparent plate formed by bonding a frame to a peripheral portion of a surface of a transparent plate, the method for producing a frame-attached transparent plate being characterized by comprising injecting a resinous material into a cavity space formed in a mold, which has a shape corresponding substantially to the shape of a frame, to form the frame; opening the mold to expose outside at least a surface to be bonded to the transparent plate, of the frame; arranging the transparent plate to oppose to the frame; projecting the frame from the mold so as to correspond to a curved shape formed in a peripheral portion of the transparent plate to thereby press the frame to a surface of the transparent plate, and bonding the frame onto the peripheral portion of the transparent plate.

In this method for producing a frame-attached transparent plate, the shape in cross section of the frame to be molded in the mold can optionally be selected and a poor dimensional accuracy, a poor bonding strength, and poor appearance and so on do not occur.

Further, in the method for producing a frame-attached transparent plate, the frame is projected for bonding from the mold in correspondence to a curved shape in the periphery of the transparent plate. Accordingly, a mold in which parting surfaces are flat or nearly flat in shape can be employed even when the transparent plate is bend-shaped, and the determination of the relative partitions of the transparent plate and the frame can be simplified in comparison with the conventional techniques.

Namely, in the method for producing a frame-attached transparent plate, the above mentioned objects of the present invention, e.g., the reduction of cost for the mold, the simplification of steps for manufacturing, can be achieved.

In this case, it is preferable that a pushing means capable of projecting and retracting with respect to a parting surface of the mold is provided in the mold, and the frame is projected by means of the pushing means. According to the method for producing a frame-attached transparent plate, for example, a frame formed in a flat state can be certainly and continuously bonded to a curved plane of a transparent plate.

Further, in the method for producing a frame-attached transparent plate, it is preferable to project the frame with a plurality of pushing pins independently from the mold. According to the method for producing a frame-attached transparent plate in which each of the pushing pins can be projected independently, various types of transparent plates having different curvatures can be treated by determining suitably and separately dimensions of projection on each of the pushing pins.

In the method for producing a frame-attached transparent plate of the present invention, it is preferable that in order to increase a bonding strength between the frame and the transparent plate, a preliminary bonding is conducted by pressing the projected frame to a surface of the transparent plate, and a primary bonding is conducted by pressing the preliminarily bonded frame to the transparent plate.

Further, the present invention provides an apparatus comprising a mold for a frame-attached transparent plate, which has a cavity space having a shape corresponding substantially to the shape of a frame to be attached to a peripheral portion of a surface of a transparent plate of a frame-attached transparent plate and into which a resinous material is injected to form the frame, the apparatus used for producing a frame-attached transparent plate being characterized in that a large number of pushing pins are arranged with predetermined intervals along a continuing direction of the frame so as to be projected and retracted with respect to parting surfaces of the mold wherein the pushing pins are disposed so that they press the frame toward the transparent plate when the mold is opened so that the transparent plate is opposed to the frame, and that the length of projection of each of the pushing pins can be selected.

In this case, it is preferable that the length of projection of each of the pushing pins can be selected depending on a curved shape of the periphery of the transparent plate.

Since the mold for the apparatus used for producing a frame-attached transparent plate is provided with a plurality of pushing pins which can project and retract with respect to parting surfaces of the mold, the frame can certainly and easily be bonded to a transparent plate having a curve even in a case that the parting surfaces are formed to be flat or nearly flat. Further, universality is obtainable with respect to various kinds of transparent plates having different curvatures by selecting separately the length of projection of each of the pushing pins.

In the method for producing a frame-attached transparent plate or the apparatus used for the method according to the present invention, it is preferable to provide such a construction that the parting surfaces of the mold are held in a horizontal state and the frame is projected in a vertical direction. In this case, it is further preferable to provide such a construction that the transparent plate is arranged above the frame to oppose to it, and the frame is projected upward.

In a case that the parting surfaces are maintained in a vertical state and the frame is projected in a horizontal direction, there may be a disadvantage that the frame deflects due to its dead weight or a disadvantage that it drops. In order to prevent such disadvantages, it is necessary to add separately a special means to hold the frame. On the other hand, in a case that the frame is projected downward in a vertical direction to press it to the transparent plate, it is enough to add an engaging means to prevent the frame from dropping from the mold when the mold is opened. Further, in a case that the frame is projected upward in a vertical direction to press it to the transparent plate, it is unnecessary to provide a special means for holding the frame or an engaging means for holding the frame. In this case, the frame can be projected toward the transparent plate by only pushing a lower surface of the frame.

In the present invention, the cavity space in the mold has a shape corresponding substantially to the shape of the frame. The word "substantially" has the following meaning. Namely, when a resinous article is formed by injection-molding, the shape of the resinous article usually becomes slightly large when the resinous article has been taken out from the mold. This phenomenon is due to a release of pressure caused by releasing the resinous article from the mold. Accordingly, the cavity space formed in the mold is slightly smaller than the shape of the resinous article to be obtained. In this description, "substantially" means that the shape of the cavity space is determined in consideration of a change in the shape of the frame to be obtained.

In the present invention, it is useful to form the parting surfaces of the mold into a flat shape or a nearly flat shape. Namely, the formation of the parting surfaces having a flat or nearly flat shape can minimize error in designing the mold as well as reducing cost for manufacturing the mold. According to the method of the present invention, when the parting surfaces are made flat or nearly flat in shape, certainty and easiness do not sacrifice for the bonding of the transparent plate to the frame. Accordingly, it is useful to form the parting surfaces of the mold to be flat or nearly flat. There is an advantageous case that the parting surfaces of the mold have a curved shape, from another viewpoint. Description on this point will be described after.

In the description, a passage "parting surfaces of a mold" has the meaning as follows. First, description will be made as to the mold used for molding the frame. The mold for molding the frame comprises a pair of molds (the first mold and the second mold) as basic structural elements. Contacting surfaces between the first mold and the second mold, i.e., surfaces defining the border of these molds, when opened, are parting surfaces. Predetermined projections and recesses are formed in the first mold and/or the second mold at positions in the parting surfaces of the mold. A cavity space is formed by the projections and recesses. It is possible to constitute the mold with three or more number of molds.

The frame molded in the cavity space of the mold is bonded to a peripheral portion of the transparent plate. Since the frame is projected from the mold toward the transparent plate, the shape of the mold is such that operations for projecting the frame are not hindered. Accordingly, a surface (which is in fact a surface located in the cavity space, and a portion at which the pair of molds do not contact) which corresponds to a surface in the frame (the bonding surface of the frame) to which the transparent plate is attached, contributes the operations for projecting the frame.

In the description, the shape of "parting surfaces of the mold" can be considered as substantially the same as the shape of the bonding surface of the frame. Further, the bonding surface of the frame may be an inclined surface depending on the shape (a curved shape) of the transparent plate. Therefore, the bonding surface of the frame may not be a single surface. Accordingly, a way of thinking that a surface formed by a centerline along a longitudinal direction of the frame stands for the bonding surface of the frame does not miss the point. Accordingly, "parting surfaces of the mold" can be considered to be substantially the same as the shape of a surface formed by a centerline along a longitudinal direction of a frame. The parting surfaces of the mold being flat implies that a surface defined by the centerline along a longitudinal direction of the frame is flat.

In this description, "a nearly flat shape" means as follows. Namely, it is ideal that the parting surfaces are flat in order to reduce cost for manufacturing the mold and to reduce error in designing the mold. Therefore, it is desirable that the parting surfaces are flat if the frame to be projected toward the transparent plate can sufficiently follow a peripheral portion of the transparent plate.

On the other hand, since there are a large variety of shape on the transparent plate, there is a case that the transparent plate has a large curve. When the degree of curving is too large in the transparent plate, it is difficult for the frame to follow the peripheral portion of the transparent plate. In the case that a degree of curving of the transparent plate is large, it is effective that the parting surfaces are slightly curved so that the frame can follow the peripheral portion of the transparent plate. In forming curved parting surfaces, however, a degree of curving in the parting surfaces may be smaller than a degree of curving in the transparent plate. Accordingly, terms "nearly flat" in the parting surfaces mean that a degree of curving is nearly flat in comparison with a degree of curving in the transparent plate having a larger degree of curving. This means that a surface defined by the centerline along a longitudinal direction of the frame has a curved shape and shows a nearly flat shape.

The method for producing a frame-attached transparent plate and the apparatus used for the method for producing according to the present invention are useful in a case that a frame is bonded to a transparent plate having a curved shape. The reason is that even when the transparent plate is curved as described above, the parting surface of the mold can be formed to have a flat or nearly flat shape. Further, when the transparent plate is curved, a concave surface of the transparent plate is preferably arranged to oppose to the frame. The reason is as follows.

In a case of using the transparent plate for an automobile window, the concave surface of the transparent plate is often directed to an inner side of the automobile. In the arrangement of the concave surface of the transparent plate to oppose to the frame, a pushing force of the frame to the transparent plate is in a direction from an inner side of the automobile to an outer side of it in the arrangement of the frame in the automobile. Accordingly, the pushing force of the frame is applied to the surface at an inner side of the automobile. Even though there causes a poor appearance in a front surface due to the pushing force of the frame, such poor appearance of the front surface can not be seen from an outer side of the automobile. Accordingly, it is preferable to dispose the concave surface of the transparent plate to oppose to the frame.

In the present invention, the frame is projected in correspondence to a curved shape in a peripheral portion of the transparent plate.

In the description, "corresponding to a curved shape in a peripheral portion of the transparent plate" means as follows. When the transparent plate is curved, a peripheral portion of the transparent plate is formed to have an arch-like shape. Accordingly, it is ideal to project the frame in an arch-like shape so as to follow the arch-like shape of the peripheral portion of the transparent plate. In order to project the frame in an arch-like shape, it is preferable to form a pushing means to project the frame in an arch-like shape.

On the other hand, the frame can be bonded to the transparent plate even though the frame is not projected in an arch-like shape. Namely, the frame can be bonded to the transparent plate when a shape obtained by projecting the frame is rendered to be a shape formed by a group of chords which is close to an arch. In this case, the number of chords should be increased in order to bring the group of chords closer to the arch. By increasing the number of chords, a high bonding strength can be obtained (an arch is produced by increasing infinitely the number of chords). Accordingly, "corresponding to a curved shape of a peripheral portion of a transparent plate" means that the frame is projected so as to follow an arch defined by the peripheral portion of the transparent plate or to constitute a group of chords which approximates an arch. In the consideration of above, it is understood that in the description, to project the frame in "an arch-like shape" includes such meaning that the frame is projected "to provide a group of chords which approximates an arch".

In a case that the parting surfaces of the mold are flat, "projecting the frame so as to correspond to a curved shape of the peripheral portion of the transparent plate" can be said in other words as follows. Namely, a large number of portions among all portions of the frame are selected, and the distance of projection a of each of the large number of selected portions has a predetermined distance respectively. Each of the selected portions corresponds one to one to each portion in the peripheral portion of the transparent plate opposing respectively.

On the other hand, assuming that a plane defined by chords connecting end portions of each arch (which corresponds to a corner portion of the transparent plate) of the peripheral portion of the transparent plate, the distance b between the assumed plane and each portion of the peripheral portion of the transparent plate corresponds one to one to each selected portion of the frame which corresponds one to one to a portion of the peripheral portion of the transparent plate. Accordingly, the distance of projection a corresponds one to one to the distance b. Then, the relation of a difference between in each of the distance a and the distance b is considered. The difference always takes a constant value (the distance between the assumed plane and the parting surface) in each portion of the frame. Accordingly, when the parting surfaces of the mold are flat, "projecting the frame so as to correspond to a curved shape of the peripheral portion of the transparent plate" can be said in other words as described above.

As described in the description of a first embodiment, the frame of the present invention can take various shapes in selection. However, in the relation of the frame to the transparent plate, the frame is formed to have a shape to be bonded to only a surface as well as its near edge of the transparent plate, or only a surface of it. It is preferable that from the viewpoint of error in dimensions of the transparent plate, the frame takes a shape to be bonded to only a surface of the transparent plate. The application of the present invention to a frame having a preferred shape can eliminate effectively a poor dimensional accuracy, a poor bonding strength and a poor appearance.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DETAILED DESCRIPTION OF THE PREFERRED EMBODIMENTS

In the following, embodiments of the present invention will be described in detail with reference to the drawings.

Figure 1:
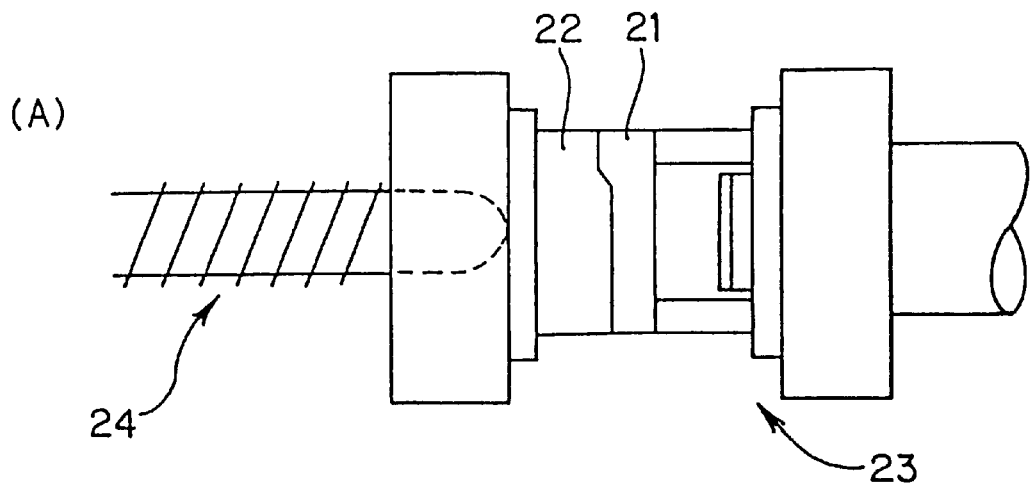
FIGS. 1A and 1B show diagrams of an injection-molding apparatus and a cavity space according to a first embodiment of the present invention.
Figure 1:
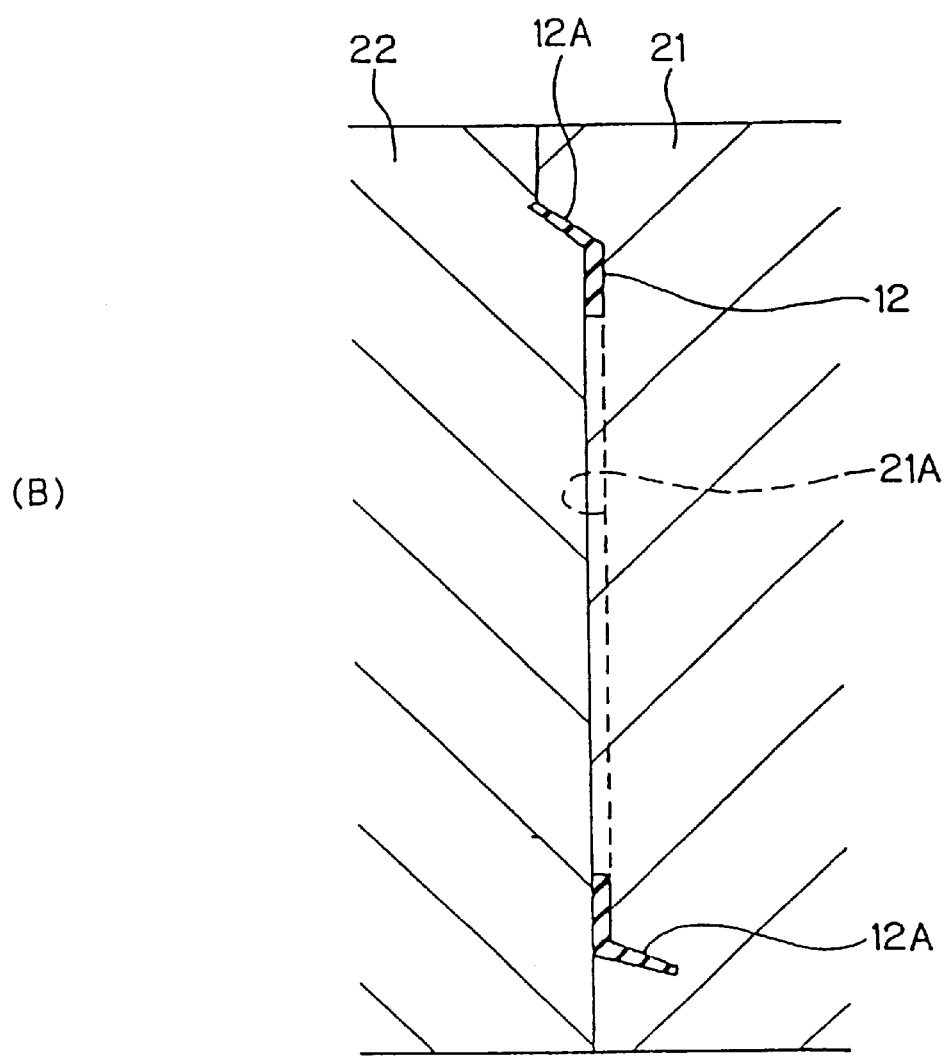
Figure 2:
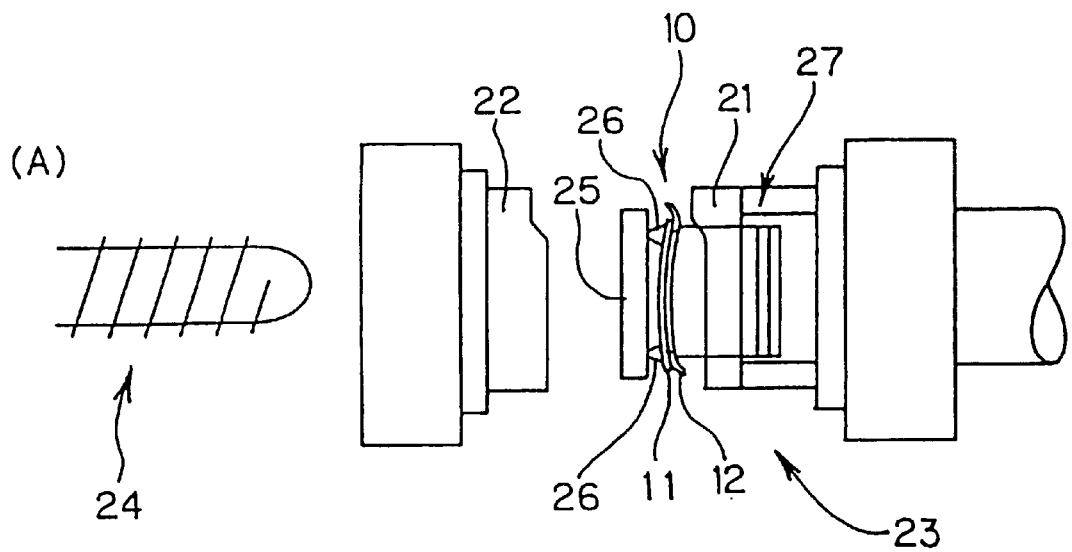
FIGS. 2A and 2B show a diagram showing a state of the injection-molding apparatus opened and a diagram showing a preliminarily boding step for a frame.
Figure 2:
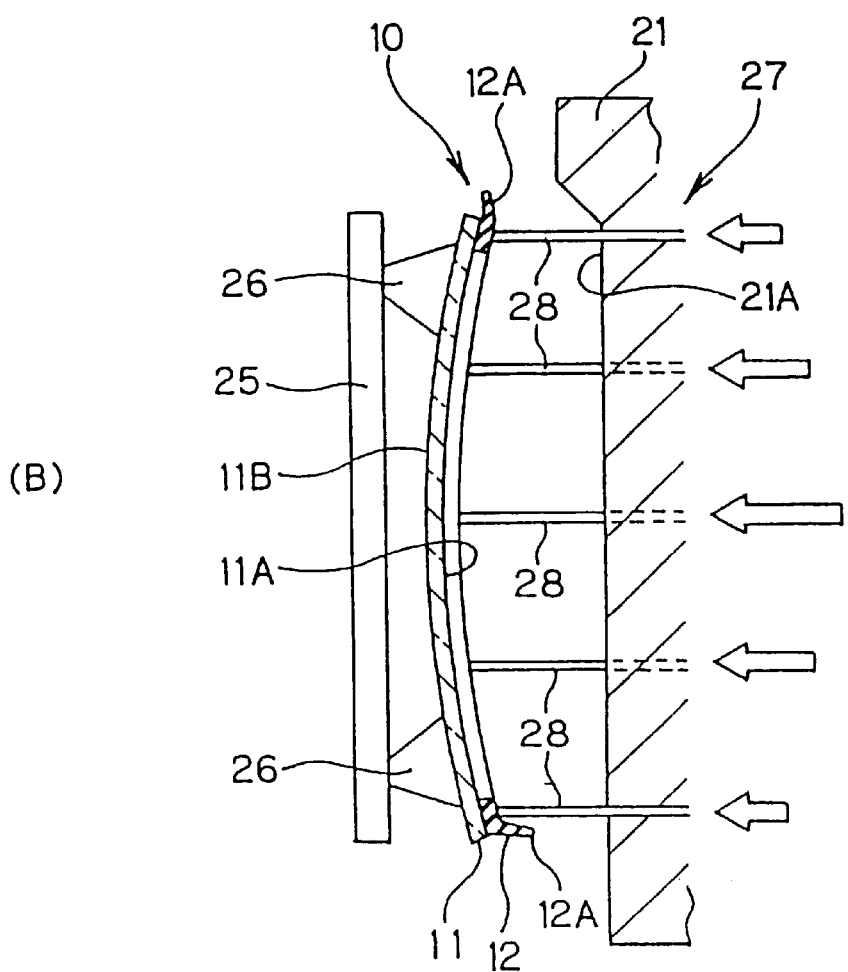
Figure 3:
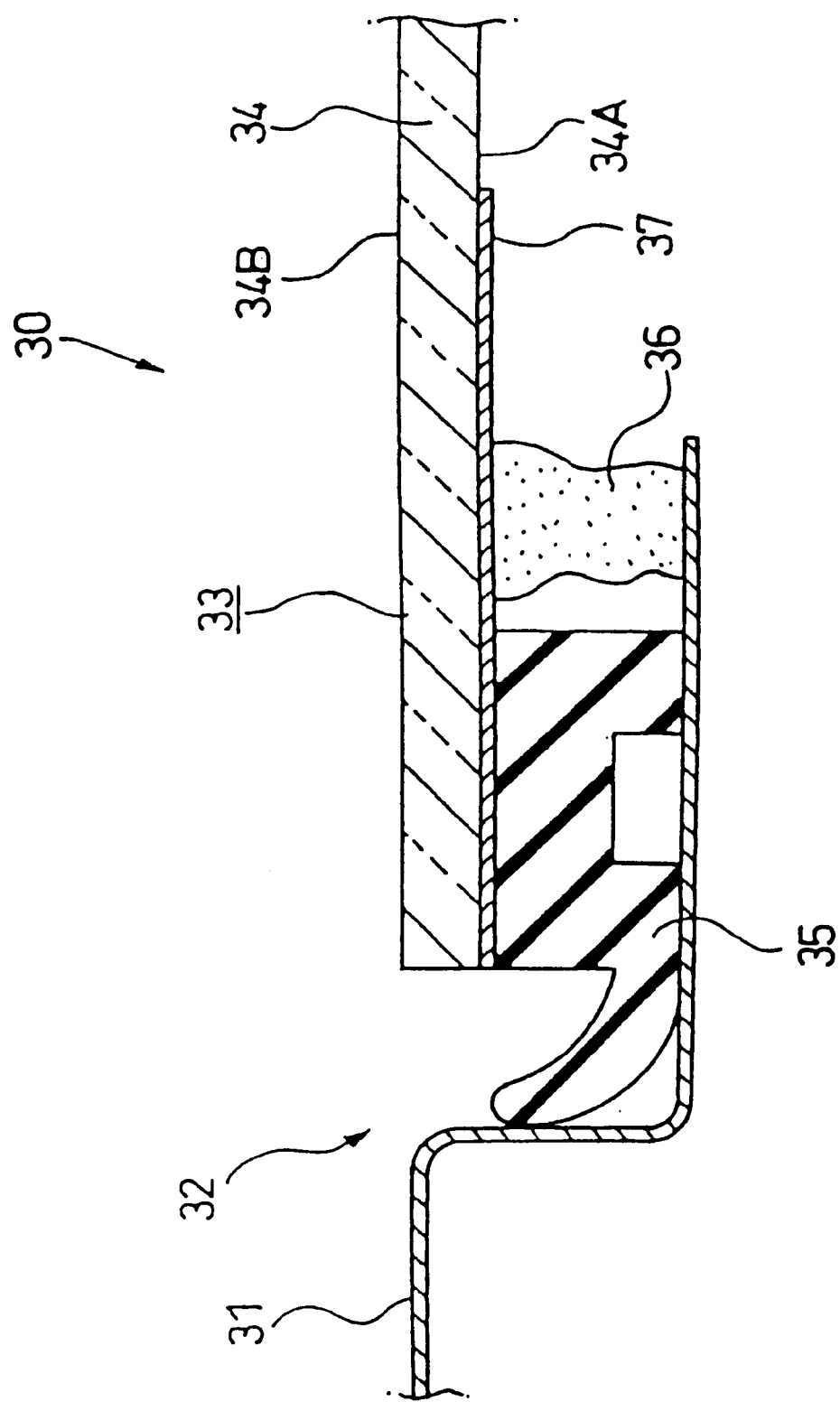
FIG. 3 is an enlarged cross-sectional view of an important portion of a frame-attached glass plate.

A first embodiment shown in FIGS. 1A, 1B, 2A and 2B concerns a method for producing a frame-attached glass plate 10 used for a fixed window of an automobile. The frame-attached glass plate 10 comprises a glass plate 11 bend-shaped in a two-dimensional direction or a three-dimensional direction and a frame 12 provided in a peripheral portion of a rear surface 11A of the glass plate 11 (FIGS. 2A and 2B).

In FIGS. 1A, 1B, 2A and 2B, although top and bottom directions of the figures and reference numerals do not coincide with each other for the convenience of drawing the figures, a left side of each figures corresponds to an upper direction in a state that the reference numerals are readable straightforward.

Such frame-attached glass plate 10 is manufactured according to the following steps.

Namely, a pair of molds (a first mold 21 and a second mold 22) of a mold are locked with a mold locking device 23 as shown in FIGS. 1A and 1B. Then, a molten resinous material is injected through an injecting device 24 into a cavity space formed at a position of parting surfaces of the first mold 21 and the second mold 22 to injection-mold the frame 12.

The cavity exists at the parting surfaces of the first mold 21 and the second mold 22. The cavity space is a cave formed only in the parting surfaces of the first mold 21 or the parting surface of the first mold 21 and the second mold 22, and the cavity space substantially corresponds to the shape of the frame 12 when both the molds are locked. The parting surfaces of the first mold 21 and the second mold 22 are made flat respectively except for a portion of the cave.

The frame 12 of this embodiment has a substantially annular shape corresponding to the shape of a peripheral portion of the glass plate 11 in a projected plane, and is formed so that the shape in cross section is continuously changed over the entire periphery, namely, it is formed so that the direction and the angle of projection of lip 12A are continuously changed (FIG. 1B). However, the frame is not limited to the above-mentioned shape and it may have the same cross-sectional shape over the entire periphery. Further, they may be formed partially in the entire periphery of the glass plate 11.

As material for the frame 12, a thermoplastic resin such as a vinyl chloride type resin, an olefin type resin, stylene type resin or the like can be exemplified.

Then, as shown in FIG. 2A, the injecting device 24 is moved away from the mold locking device 23, and the mold locking device 23 is operated to open the first mold 21 and the second mold 22 so as to separate them from each other so that a bonding surface of the frame 12 is exposed outside.

Thereafter, the glass plate 11, which is separately manufactured, is held by a holding device 25 to place it between the first mold 21 and second mold 22. At this moment, a front surface 11B curved in a convex shape of the glass plate 11 is held by the holding device 25 by means of sucking disks 26, 26 and a rear surface 11A curved in a concave shape is arranged to oppose to the first mold 21. Primer (adhesive agent) is coated on a peripheral portion of the rear surface 11A of the glass plate 11.

Subsequently, the frame 12 is projected from the first mold 21 by means of a pushing means 27 provided in the first mold 21 while the frame 12 is deformed in an arch-like shape in correspondence with a curvature of the rear surface 11A.

As the pushing means 27 in the first embodiment, a plurality of pushing pins 28 which are capable of projecting and retracting with respect to the first mold 21 are exemplified. These pushing pins 28 are projected and retracted in parallel to each other from a cavity wall 21A of the first mold 21 by means of a cylinder or the like (not shown) and the length of projection of each of the pins can be determined independently.

The frame 12 is pressed to the rear surface 11A of the glass plate 11 by the pushing means 27 and is preliminarily bonded with the primer.

Finally, the glass plate 11 is moved from the space between the first mold 21 and the second mold 22 by means of a molded article taking device (not shown), and is placed on a pressing jig heated to an appropriate temperature whereby the frame is primarily bonded to the glass plate 11 to obtain the frame-attached glass plate 10.

According to the first embodiment, the shape in cross section of the frame 12 can optionally be selected because the frame is injection-molded in the first mold 21 and the second mold 22, and there is little possibility of causing a poor dimensional accuracy, a poor bonding strength, a poor appearance and so on.

According to the first embodiment, since the frame 12 is projected for bonding from the first mold 21 while an arch-like shape is kept, the first mold 21 and the second mold 22 each having a flat parting surface can be employed, and the determination of the relative position of the glass plate 11 and the frame 12 can be simplified in comparison with the conventional techniques. Thus, such advantages that cost for the mold can be reduced; steps for manufacturing are not complicated: a time for manufacturing can be shortened in comparison with the conventional techniques to thereby increase remarkably efficiency of production.

In the first embodiment, since the pushing means 27 is provided in the first mold 21, the frame 12 can certainly and continuously be bonded to the glass plate 11 curved in a two-dimensional direction or a three-dimensional direction.

Further, a plurality of pushing pins 28 are employed as the pushing means 27. Accordingly, the dimension of projection of each of the pushing pins 28 can suitably and independently be determined whereby universality is obtainable to another glass plate 11 having a different curvature, and the application to a large variety, small quantity production is possible.

The present invention is not limited to the first embodiment but a suitable modification, improvement or the like is possible.

In the following, the second to fifth embodiments of the present invention will be described. In each of the embodiments described below, parts or portions with the same or corresponding reference numerals in FIGS. 1 and 2 perform basically the same function or effect as those of the first embodiment. Accordingly, description of these parts or portions may be simplified or omitted.

Figure 4:
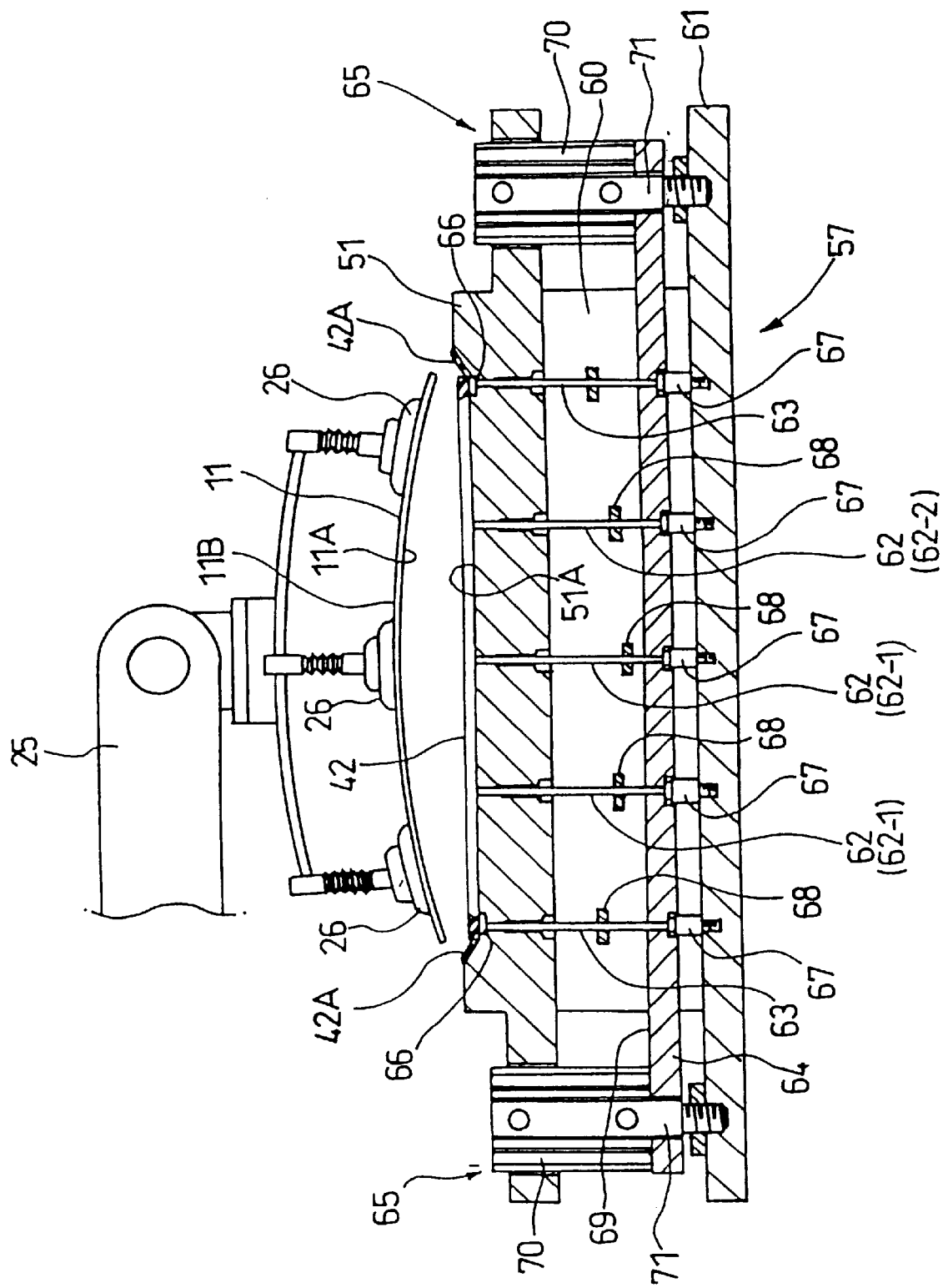
FIG. 4 is a cross-sectional view showing a state of an injection-molding apparatus in which a mold is opened according to a second embodiment of the present invention.

FIGS. 4 to 9 show in detail a first mold 51 and a pushing means 57 according to the second embodiment. A glass plate 11 in the second embodiment has a substantially semi-elliptical shape (in a projected plane), and a curve is formed along a short axis and a long axis of the semi-elliptical shape. FIG. 4 shows an end face along a short axis.

The first mold 51 has a flat cavity wall 51A, and is supported by leg members 60 set up on a support table 61. A frame 42 to be injection-molded through the first mold 51 is provided with a lip 42A over its entire periphery wherein the direction and the angle of projection of the lip are the same, and the frame has a plane of substantially semi-elliptical shape which corresponds to a plane-like shape of the glass plate 11. A second mold is omitted from the figure.

The pushing means 57 comprises a plurality of pushing pins 62,63 which penetrate the first mold 51 and are capable of projecting and retracting with respect to a cavity wall 51A, an elevating means 64 disposed below the first mold 51 to ascend or descend each of the pushing pins 62,63 and a plurality of cylinders 65 to ascend or descend the elevating means 64. The pushing pins 62,63 are arranged with predetermined intervals at the cavity wall 51A of the first mold 51 so as to be along a continuous direction of the frame 42.

Figure 5:
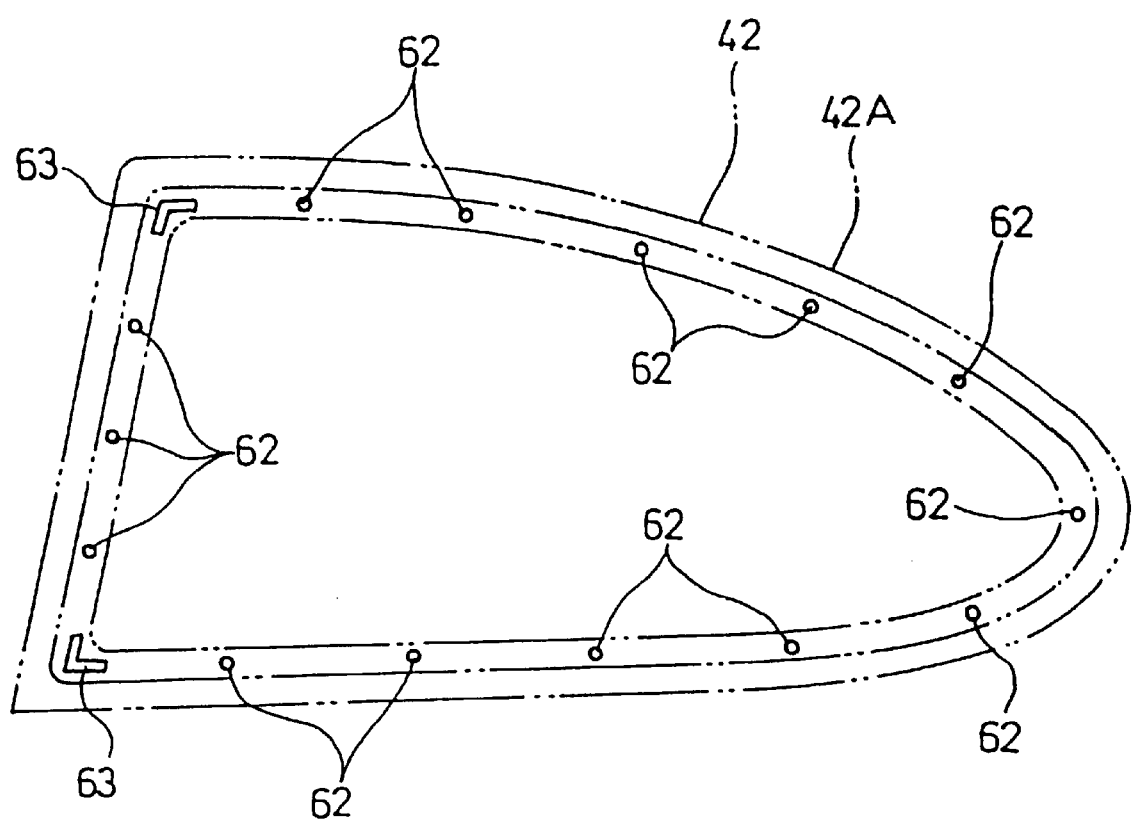
FIG. 5 is a plan view as a model which shows an arrangement of pushing pins.
Figure 6:
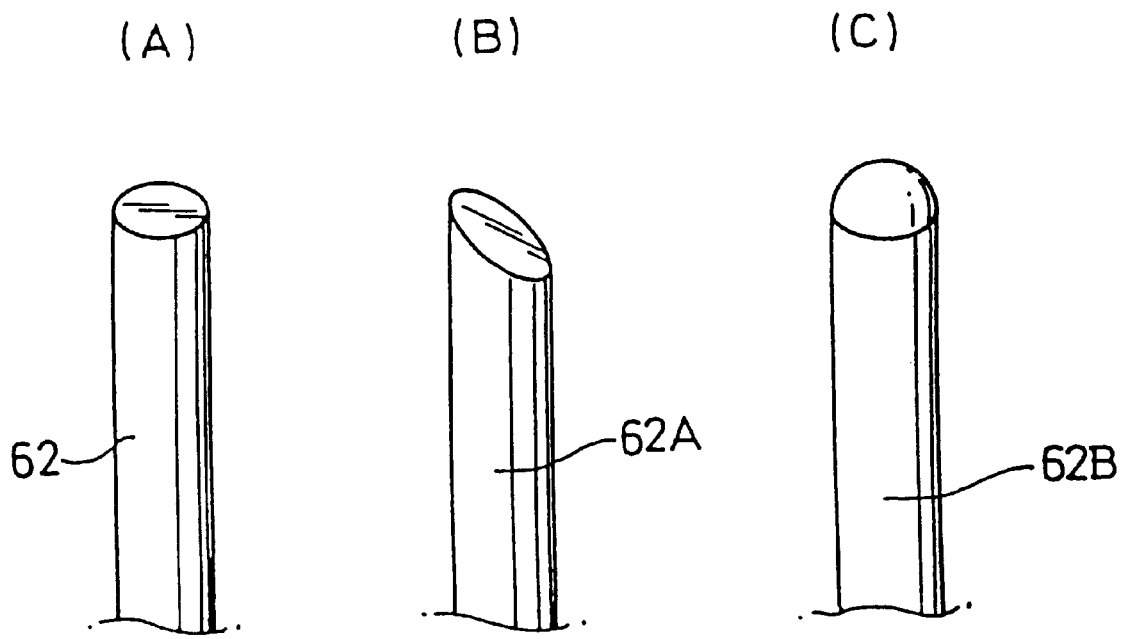
FIGS. 6A, 6B, and 6C show enlarged perspective views of an important portion of pushing pins.
Figure 7:
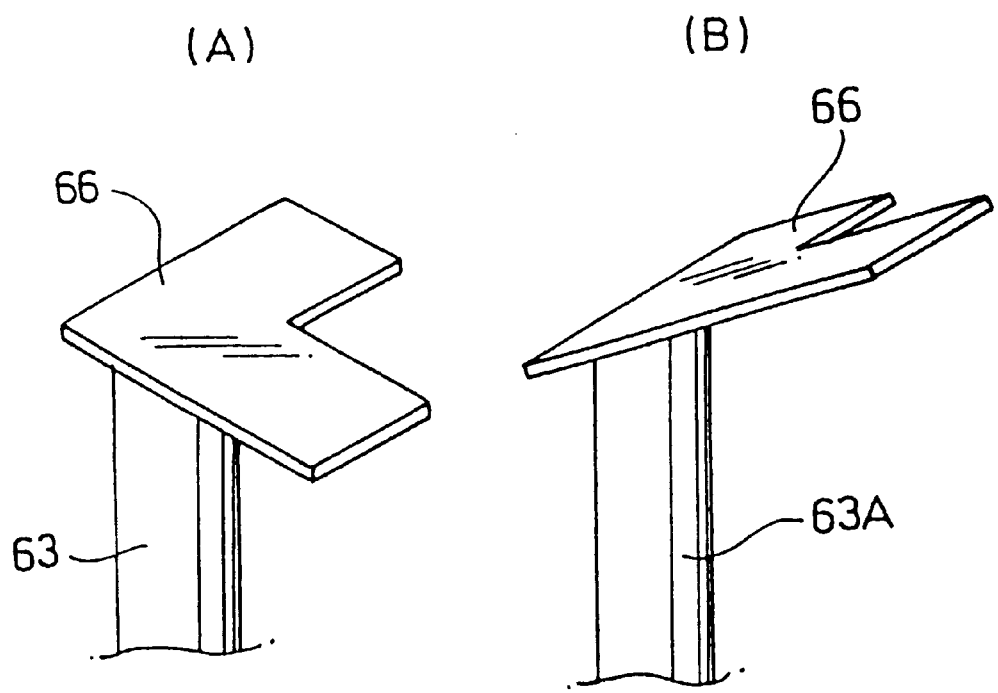
FIGS. 7A and 7B show enlarged perspective views of an important portion of pushing pins.

As shown in FIG. 5, pushing pins 62 are arranged at positions corresponding to a linear portion and a curved portion of the frame 42, and pushing pins 63 are arranged at positions corresponding to corner portions (in a projected plane) of the frame 42.

As shown in FIG. 6A, a pushing pin 62 is in an elongated round rod-like form (a round rod-like form) and the surface at the top is perpendicular to the axial line.

For the pushing pin 62 placed corresponding to the linear portion and the curved portion of the frame 42, a pushing pin 62A wherein the surface at the top intersects at a predetermined angle with respect to the axial line may be used provided that there is no rotation around the axis as shown in FIG. 6B, or a pushing pin 62B whose surface at its top is in a substantially spherical shape may be used as shown in FIG. 6C.

For the pushing pin 62, a pushing pin having a stepped portion wherein the top end portion has a smaller diameter or a larger diameter, or a pushing pin having a substantially conical shape wherein the pin becomes thin or spread toward its top end portion, may be used.

Namely, in the pushing pin 62, the shape and the surface of the top and so on can suitably be selected or combined. Such combination is determined depending on an arrangement of pins, the shape of the rear surface of the glass plate 11 and so on.

On the other hand, as shown in FIG. 7A, a pushing pin 63 is in a round rod-like shape, and a contacting plate 66 is attached to the top end portion. The contacting plate 66 has a plane of substantially L-like shape, and it is attached to the pushing pin 63 so that an in-plane direction of the plate is perpendicular to the axial line of the pushing pin 63.

Further, as shown in FIG. 7B, a pushing pin 63 with a contacting plate 66 in which the contacting plate intersects at a predetermined angle to the axial line so as to correspond to a shape of a front surface of the glass plate or an arrangement of pushing pins, may be used.

Returning to FIG. 4, on the pushing pins 62,63, the length in an axial direction from the top end portion (an upper end portion in FIG. 4) to a base end portion (a lower end portion in FIG. 4) is identical. The pushing pins 62,63 are so arranged that the position of each of the base end portions is at the same horizontal level by means of restricting members 67 provided at the support table 61 respectively. The pushing pins 62,63 are provided with a stopper at an optional position in the axial direction respectively.

Figure 8:
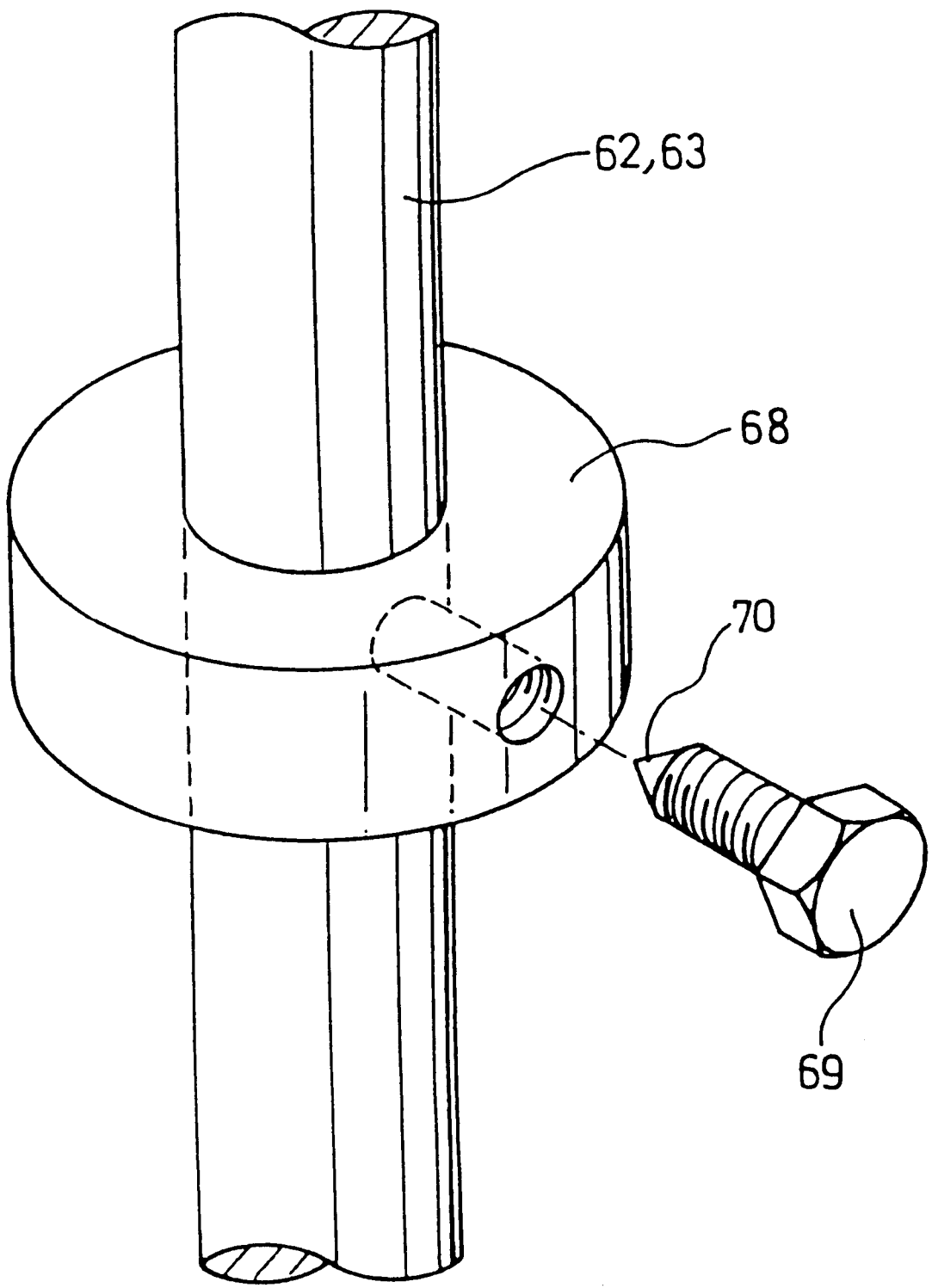
FIG. 8 is an enlarged perspective view of an important portion of a stopper.

As shown in FIG. 8, the stopper 68 has a substantially annular shape through which the pushing pin 62 or 63 is passed. The stopper 68 can be fixed at an optional position in an axial direction of the pushing pin 62,63 by pressing the top end of a fixing bolt 69, which is engageable along a radial direction from an outer peripheral surface to an inner peripheral surface of the stopper, to an outer peripheral surface of the pushing pin 62,63. Since a top end portion 70 of the fixing bolt 69 is convergent, there is little possibility of causing a shift of position to the pushing pin 62,63 by the biting of the top end portion 70 into the outer peripheral surface of the pushing pin 62,63.

Returning to FIG. 4, a relative position of each of the projection pins 62,63 and each of the stoppers 68 is determined separately in response to a dimension of projection of the top end face of each of the projection pins 62,63 to the cavity wall 51A.

Specifically, a pushing pin 62 (herein below, referred to as 62-1) at a substantially central portion along a short axis direction of the glass plate 11 is provided with the stopper 68 which is fixed at a position near the base end portion along its axial direction. A pushing pin 62 (herein below referred to as 62-2) adjacent to the pushing pin 62-1 is so determined that the distance between the base end portion and the stopper 68 is longer than the distance between the base end portion and the stopper 68 of the pushing pin 62-1. Further, a pushing pin 63 at each of both end positions in the short axis direction of the glass plate 11 is so determined that the distance between the base end portion and the stopper 68 is longer than the distance between the base end portion and the stopper 68 of the pushing pin 62-2.

As shown further in FIG. 4, the elevating member 64 has a substantially annular form to surround a leg member 60 and has a flat upper surface 69 which is supported on the support table 61 by means of the cylinders 65 so that the upper surface is in parallel to the cavity wall 51A of the first mold 51.

Each of the pushing pins 62,63 penetrates the elevating member 64 in a direction of the thickness so that each of the stoppers 68 is positioned above the upper surface 69 of the elevating member 64.

Each of the cylinders 65 is provided with a cylinder rod 71 to be projected from or retracted to a cylinder main body 70 by, for example, an oil pressure or a pneumatic pressure. The cylinder main body 70 is fixed to the elevating member 64, and the top end portion of the cylinder rod 71 penetrates the elevating member 64 to be fixed to the support table 61. In these cylinders 65, the cylinder rod 71 is projected and retracted with respect to the cylinder main body 70 in a synchronous manner under the control of a control means (not shown), Accordingly, when each of the cylinders 65 is driven, the elevating member 64 is ascended or descended while the upper surface 69 is kept horizontally.

In the next, steps of manufacturing the frame-attached glass plate 10 in the second embodiment will be described.

First, primer is coated previously along the peripheral portion of the rear surface 11A of the glass plate 11, and the glass plate 11 is preheated so that the temperature at its front surface becomes, for example, about 80° C. Then, the front surface 11B is held by the holding device 25 by means of the sucking disks 26.

On the other hand, the frame 42 is injection-molded in association with the first mold 51 at a lower side and the second mold at an upper side(not shown), and then, a bonding surface of the frame 42 is exposed outside. Thereafter, the holding device 25 is operated so as to dispose the rear surface 11A of the glass plate to oppose to the frame 42.

Then, each of the cylinders 65 is driven in a synchronous manner by the control means (not shown) to ascend the elevating member 64.

The elevating member 64 raises the pushing pins 62,63 respectively through each of the stoppers 68 to thereby project the top end portion of each of the pushing pins 62,63 from the cavity wall 51A of the first mold 51.

In this case, since the distance between the base end portion and the stopper 68 is different on each of the pushing pins 62,63, the pushing pin 62-1 is first ascended with the ascending of the elevating member 64. Then, the pushing pin 62-2 initiates to ascend, and then, the pushing pin 63 initiates to ascend.

Accordingly, a substantially central portion along a short axis of the frame 42 is pushed from the first mold 51 toward the rear surface 11A of the glass plate 11, and then, portions of both sides of the central portion are pushed sequentially toward the rear surface 11A of the glass plate 11 whereby the frame is deformed in an arch form.

Figure 9:
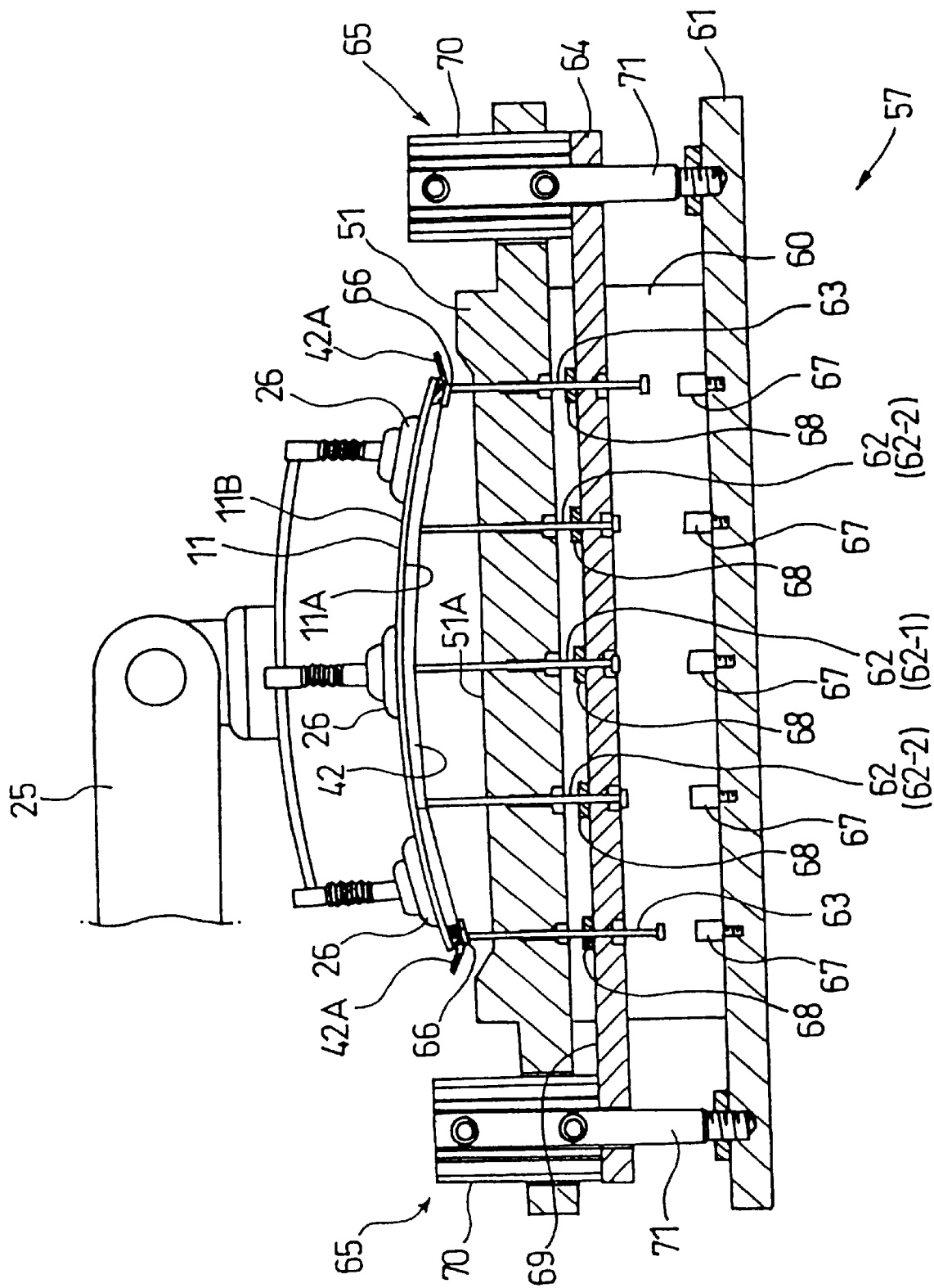
FIG. 9 is a cross-sectional view showing the function of a pushing means shown in FIG. 4.

Finally, the frame 42 is pressed simultaneously to the entire region of the peripheral edge portion along a short axis of the rear surface 11A of the glass plate 11, to thereby conduct preliminarily bonding (FIG. 9). The frame 41 is pressed simultaneously not only to the peripheral edge portion along a short axis of the glass plate 11 but also to the entire region of the peripheral edge portion of the rear surface 11A of the glass plate 11.

In this case, the bonding strength of the primer coated on the glass plate 11 is increased because it is heated by thermal inertia in the glass plate. On the other hand, the frame 42, due to the thermal inertia just after injection-molding, has a good shape-follow-up ability to the rear surface 11A of the glass plate 11.

Accordingly, the frame 42 can be preliminarily bonded over the entire region of the peripheral edge portion of the rear surface 11A of the glass plate 11 without causing the concentration of a deforming stress at a specified portion or a gap.

When the elevating member 64 is descended after the frame 42 has been preliminarily bonded to the rear surface 11A of the glass plate 11, all the pushing pins 62,63 follow the movement of the elevating member 64 due to their own weight so that the base end portions return to the initial positions at which they contact the restricting member 67.

Figure 10:
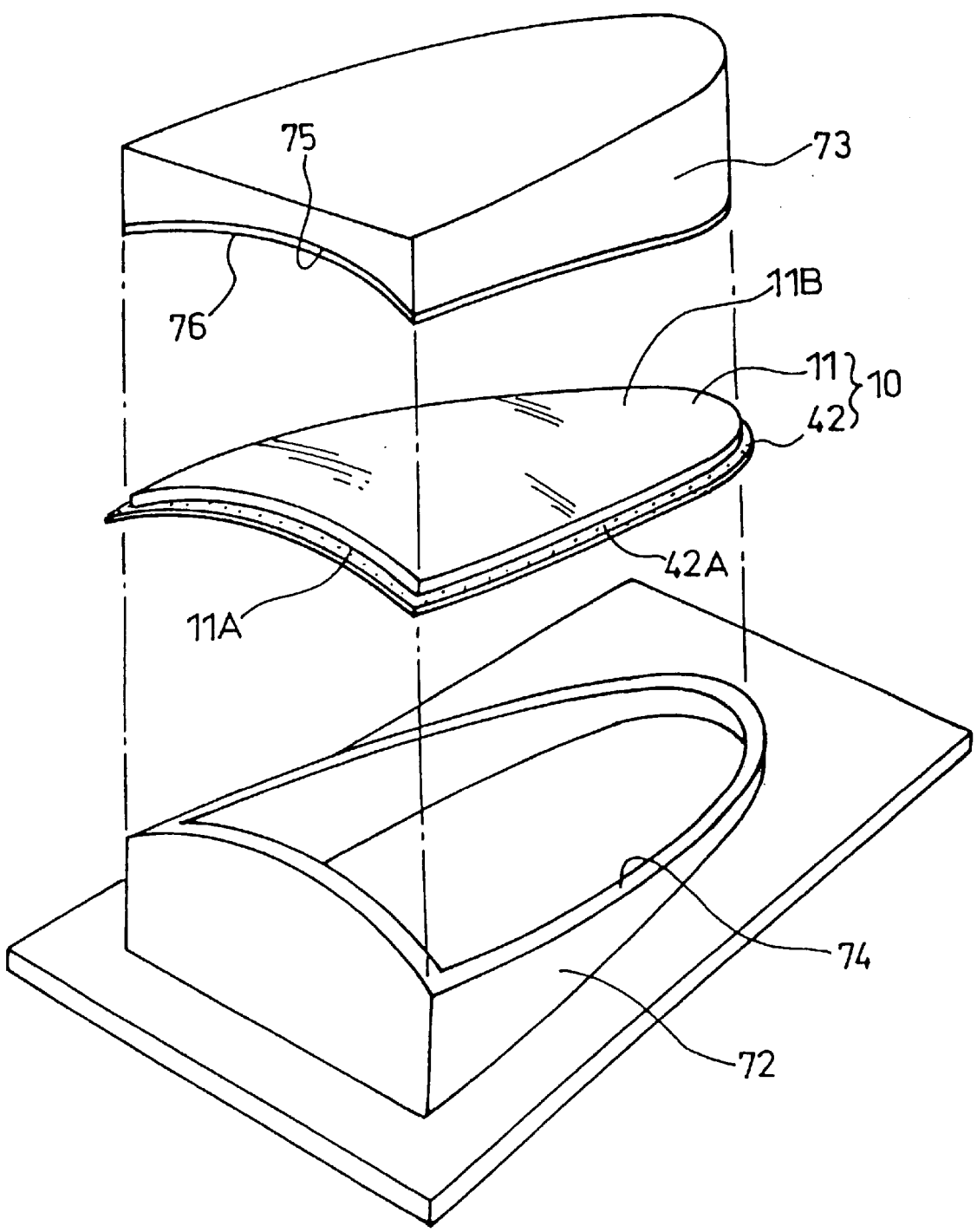
FIG. 10 is a perspective view as a model which shows a mold for primarily bonding.

Then, the glass plate 11 and the frame 42 which are preliminarily bonded to each other are moved to a space between molds 72,73 for primarily bonding by means of a holding device(not shown) (FIG. 10).

The mold 72 for primarily bonding has a substantially belt-like pressing surface 74 corresponding to the shape of the peripheral portion of the rear surface 11A of the glass plate 11. On the other hand, the mold 73 for primarily bonding has a pressing surface 75 of substantially elliptical shape (in a projected plane) corresponding to the shape of the front surface 11B of the glass plate 11.

Then, the peripheral portion of the rear surface 11A of the glass plate 11 is placed by interposing the frame 42 on the pressing surface 74 of the mold 72 for primarily bonding, and the mold 73 for primarily bonding is descended so that the glass plate 11 and the frame 42 are clamped by the molds 72,73 for primarily bonding.

In this case, by attaching previously a sheet-like cushion member 76 to the mold 73 for primarily bonding along the entire region of the pressing surface 75, occurrence of a scratch or a crack or the like at a specified portion in the front surface 11A of the glass plate can be prevented.

The glass plate 11 and the frame 42 are clamped for a predetermined time (about several tens sec., for example, 50 sec.) under a predetermined pressure (for example, 0.5 kgf/cm$^2$), and then, the molds 72,73 for primarily bonding are opened to thereby obtain the frame-attached glass plate 10.

According to the first mold 51 in the second embodiment, the frame 42 is projected for bonding from the first mold 51 in an arched form to the rear surface 11A of the glass plate 11 in the same manner as the first embodiment. Accordingly, the same effects as in the first embodiment: the reduction of cost in manufacturing the mold by employing the first mold 51 having a flat or nearly flat parting surface and the shortening of manufacturing time by determining easily the relative position between the glass plate 11 and the frame 42, can be obtained.

Further, since the plurality of pushing pins 62,63 are used as the pushing means 57 in the second embodiment, application to a large variety, small quantity production is possible in the same manner as the first embodiment.

The second embodiment provides such a construction that the pushing means 57 raises each of the pushing pins 62,63 by means of the elevating member 64 and the stoppers 68. Accordingly, by selecting suitably relative positions of each of the pushing pins 62,63 and the stoppers 68, the length of projection of each of the pushing pins 62,63 can be determined optionally without a step.

In particular, since the stopper 68 can change the relative position to each of the pushing pins 62,63 by releasing the fixing bolt 69, it is unnecessary to disassemble the first mold 51 or stop the operation for a long term. Further, it is unnecessary to disassemble the first mold 51 or stop the operation for a long term for a large variety, small quantity production, and a large variety of frame-attached glass plate 10 can smoothly and quickly be produced.

Figure 11:
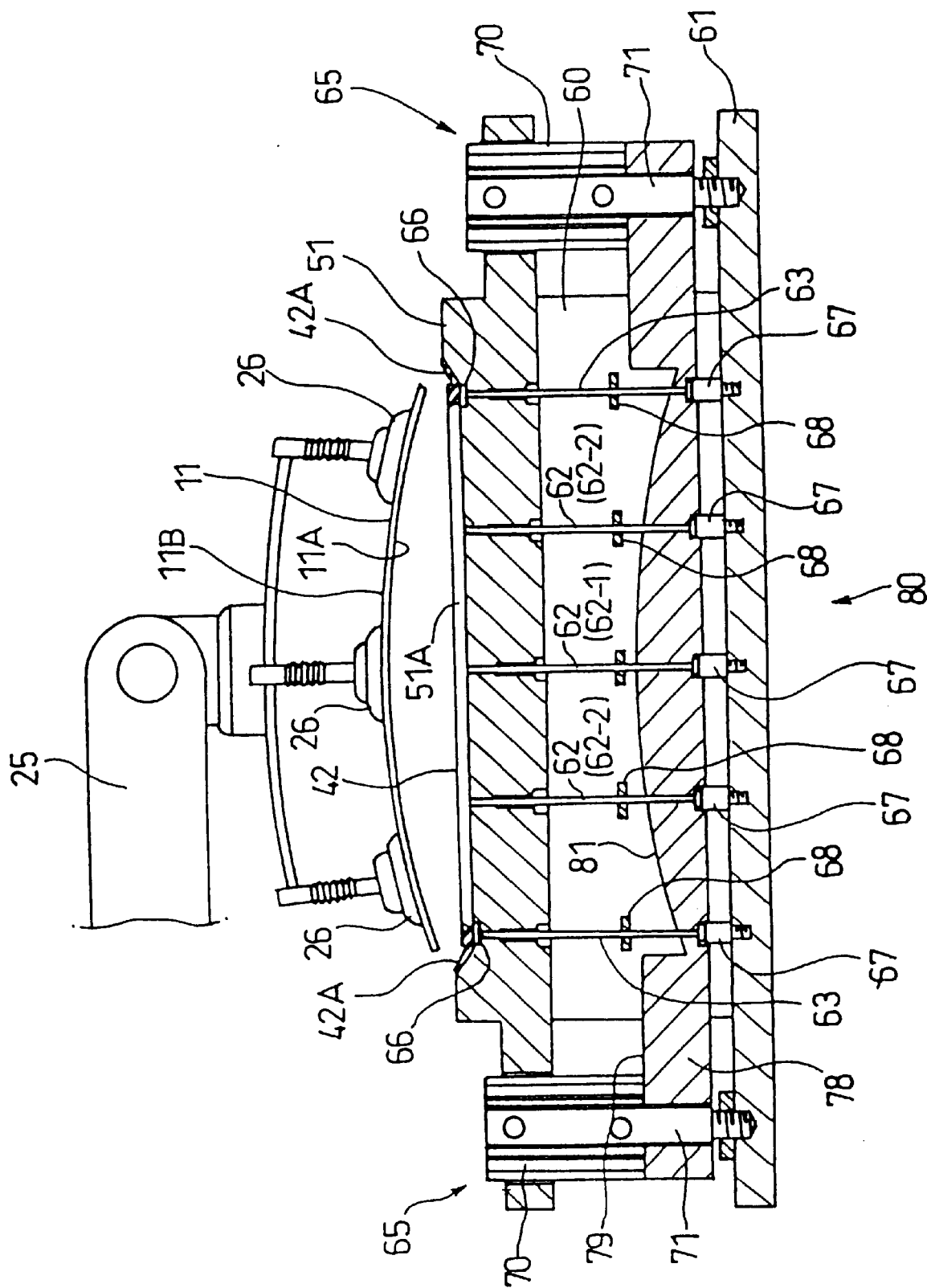
FIG. 11 is a cross-sectional view showing a state of an injection-molding apparatus in which a mold is opened according to a third embodiment of the present invention.

FIG. 11 shows a third embodiment of the present invention. An elevating means 80 in the third embodiment has basically the same construction as the elevating means 57 in the first embodiment except that an arched surface of convex shape 81 is formed in an upper surface 79 of the elevating means 78.

The shape of the front surface and the radius of curvature of the arched surface of convex shape 81 correspond to the shape and the radius of curvature of the rear surface 11A of the glass plate 11.

According to the third embodiment, a position by the stopper 68 on each of the pushing pins 62,63 is determined to be identical. When the elevating means 78 is ascended, a pushing pin 62-1 initiates ascending, then, a pushing pin 62-2 initiates ascending and then, a pushing pin 63 initiates ascending. Thus, the frame 42 is projected in an arched form in the same manner as the second embodiment.

With respect to the upper surface 79 of the elevating member 78, the flat surface may be formed substantially stepwise in correspondence with dimensions of projection of each of the pushing pins 62,63.

Figure 12:
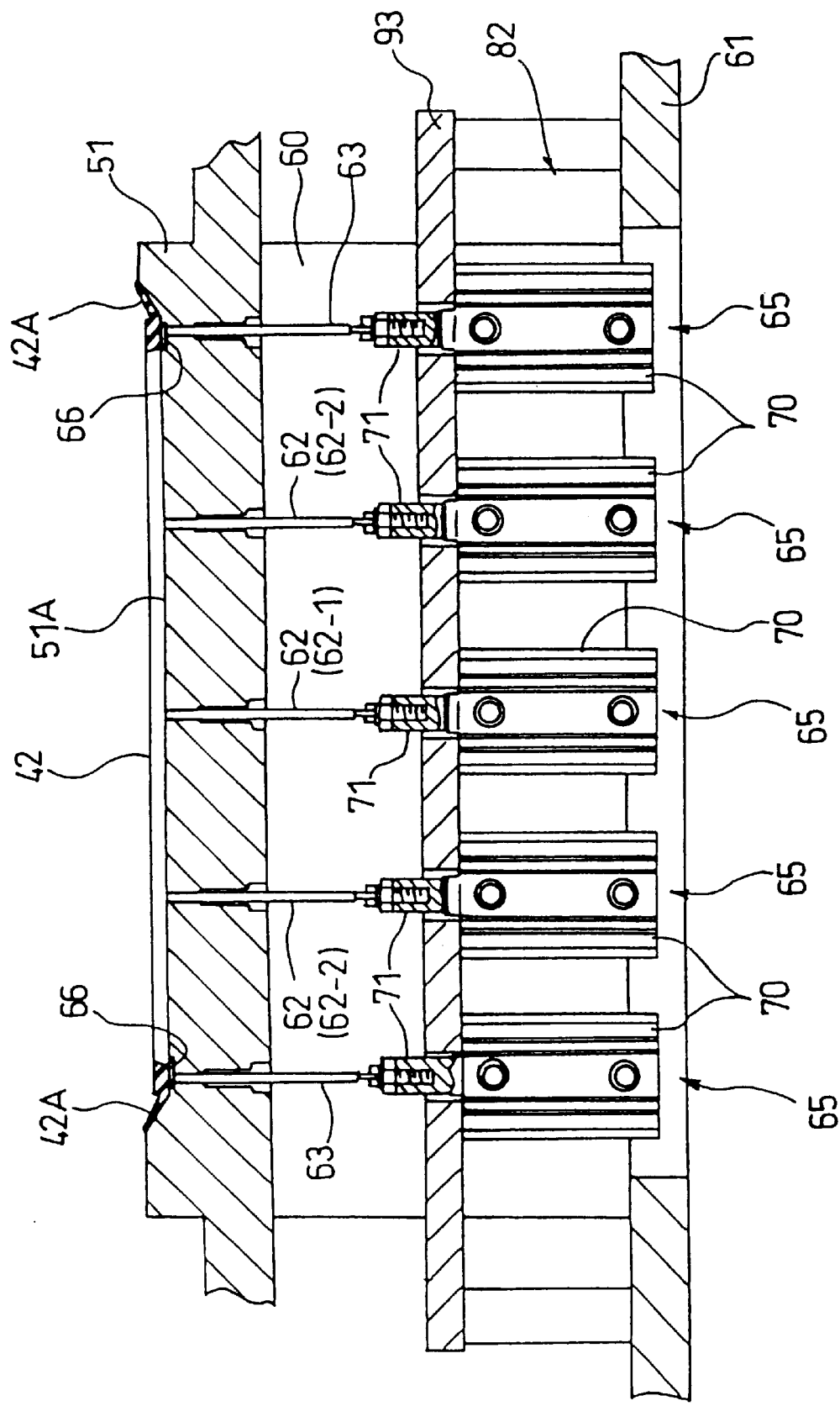
FIG. 12 is a cross-sectional view showing a state of an injection-molding apparatus in which a mold is opened according to a forth embodiment of the present invention.

FIG. 12 shows a fourth embodiment of the present invention. An elevating means 82 in the fourth embodiment is provided with a plurality of cylinders 65 each of which projects each of the pushing pins 62,63 directly and separately from the cavity wall 51A. The cylinders 65 respectively have a cylinder rod 71 arranged upward, and they are connected to each other by means of a connecting member 93.

According to the fourth embodiment, since the elevating means 80 has a large number of cylinders 65 which respectively correspond to the pushing pins 62,63, and each of the pushing pins 62,63 can successively be projected with delay from the cavity wall 51A by driving separately each of the cylinders 65. Thus, according to the fourth embodiment, the frame 42 is projected in an arched form in the same manner as the second embodiment and the third embodiment.

According to the fourth embodiment, the order of projection and the speed of projection of each of the pushing pins 62,63 can optionally be selected by controlling each of the cylinders 65. Accordingly, a mode of bonding the frame to the rear surface 11A of the glass plate 11 can be changed.

Namely, in the second embodiment and the third embodiment, the pushing pins 62,63 are projected sequentially with delays whereby the entire region of the frame 42 is finally pressed simultaneously to the rear surface 11A of the glass plate 11. According to the fourth embodiment, for example, a specified portion of the frame 42 can be pressed to the rear surface 11A of the glass plate 11, and then, other portions of the frame 42 can be pressed sequentially to the rear surface 11A of the glass plate 11.

Accordingly, this embodiment is advantageous in a case that for example, the rear surface 11A of the glass plate 11 is curved very complicatedly, or the dimension in the thickness or the shape in cross section of the frame 42 is ununiform.

In the fourth embodiment, use of the stopper in the second embodiment and the third embodiment is optional.

Figure 13:
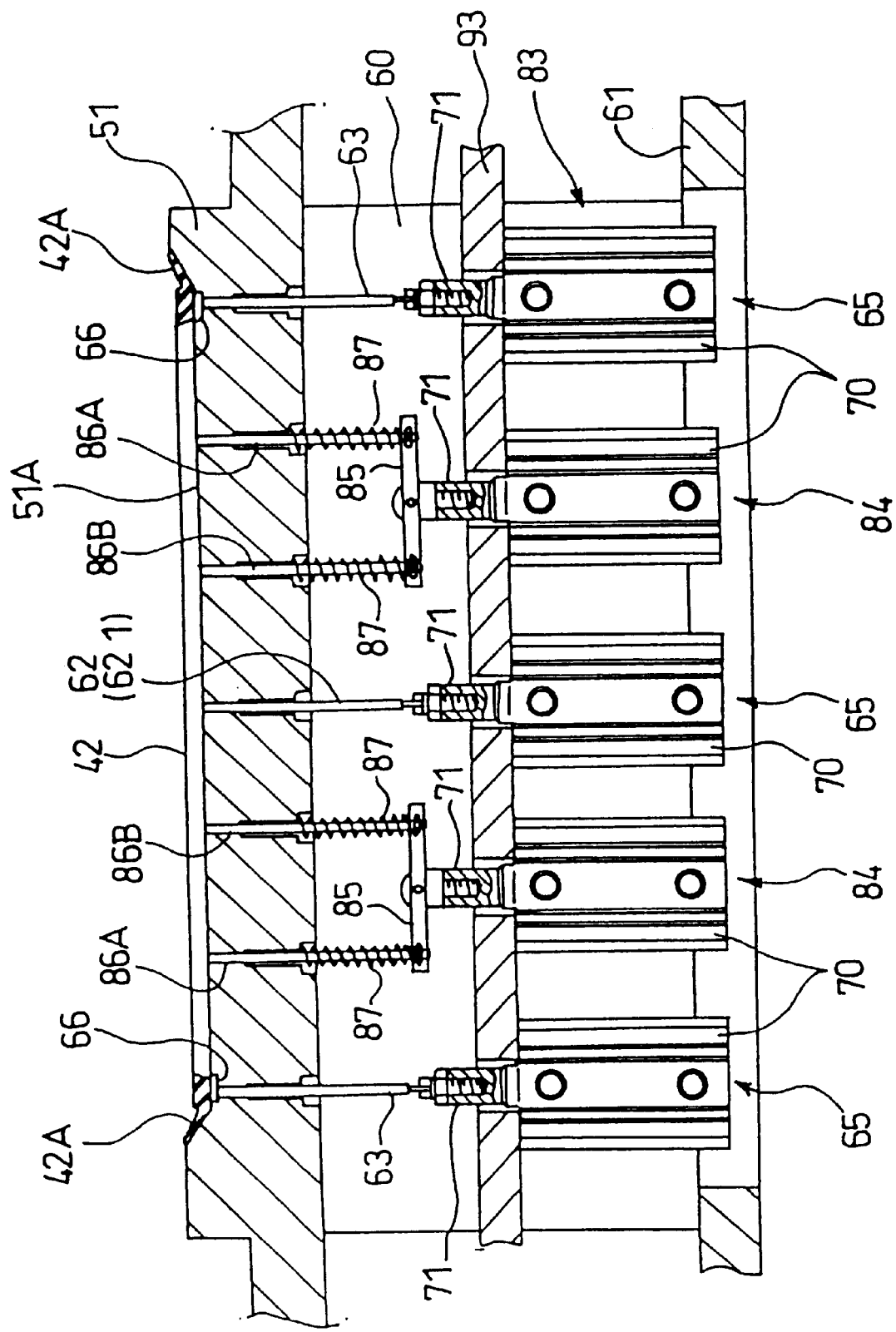
FIG. 13 is a cross-sectional view showing a state of an injection-molding apparatus in which a mold is opened according to a fifth embodiment of the present invention.

FIG. 13 shows a fifth embodiment of the present invention. The fifth embodiment is a modification of the fourth embodiment wherein cylinders 84 constituting an elevating means 83 are adapted to project two pushing pins 86A, 86B by means of oscillating members 85.

Figure 14:
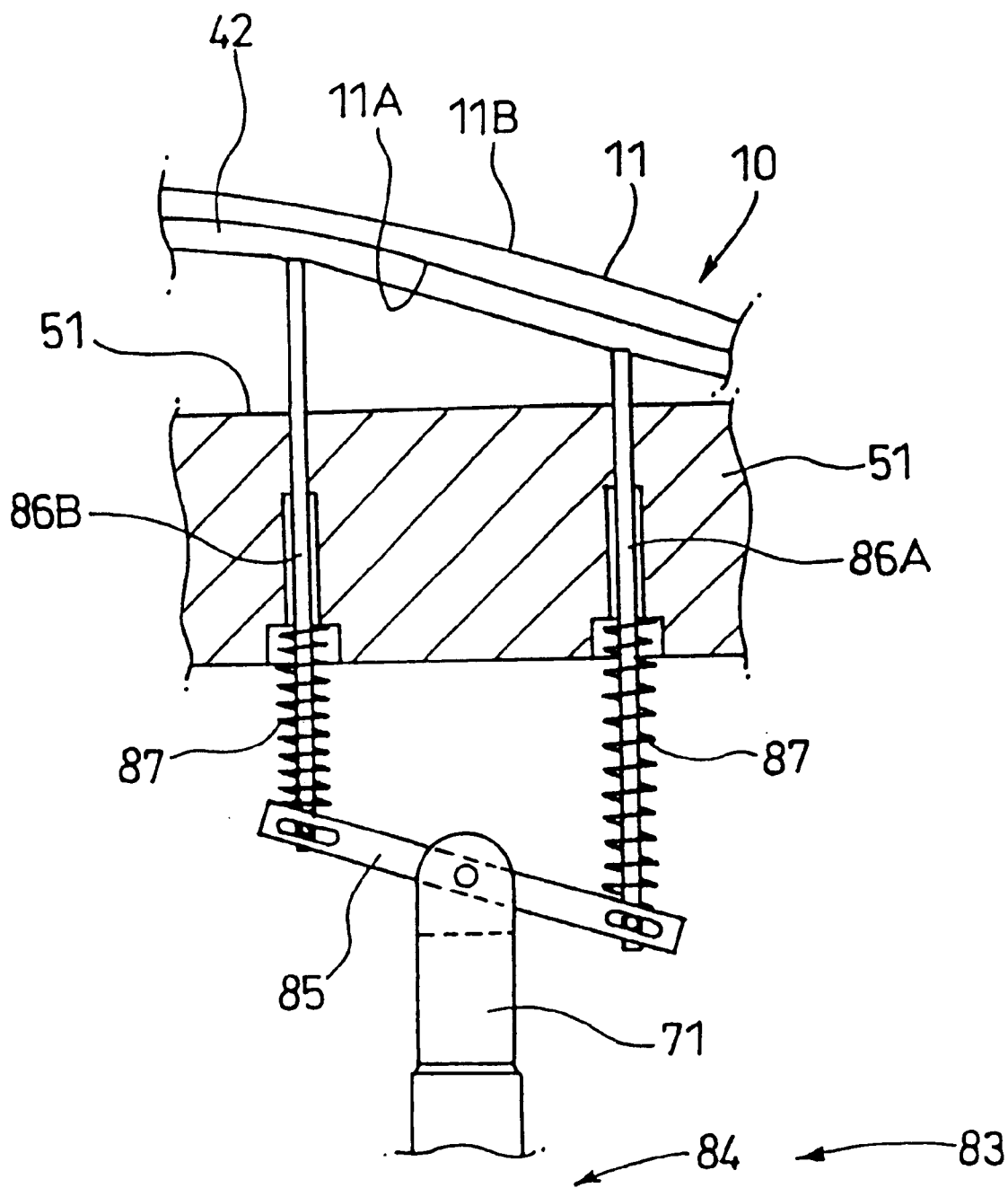
FIG. 14 is an enlarged cross-sectional view of an important portion which shows a pushing means shown in FIG. 13.

As shown in FIG. 14, the pushing pins 86A, 86B have the same length in an axial direction. The pushing pins 86A, 86B are inserted in compression springs 87, and a base end portion of the pushing pins is respectively connected to each end portion of each of the oscillating members 85 by means of pins.

In the fifth embodiment, when the cylinders 84 are driven, the pushing pins 86A, 86B are projected simultaneously from the cavity wall 51A to project partially the frame 42 in a horizontal state.

Then, when a specified portion of the frame 42, which corresponds to a pushing pin 86A, is pressed to the rear surface 11A of the glass plate 11, the oscillating member 85 oscillates clockwise around the top end portion of the cylinder rod 71 (FIG. 14) whereby the speed of projection of the pushing pin 86B is accelerated.

According to the fifth embodiment, since two pushing pins 86A, 86B are projected by the cylinder 84, the number of pushing pins can widely be selected in comparison with the first to fourth embodiments, and the frame 42 can projected in a stable manner.

According to the fifth embodiment, two pushing pins 86A, 86B are connected to the cylinder 84 by means of the oscillating member 85. Accordingly, when one of the pushing pins 86A,86B presses a specified portion of the frame to the rear surface 11A of the glass plate 11, the speed of projection of the other between the pushing pins 86A,86B is accelerated whereby the speed of the manufacturing step can be increased. Further, it is possible that the pushing pins 86A, 86B can follow the shape of the glass plate so that error in a curved shape of the glass plate 11 can be absorbed.

From the standpoint of capable of absorbing error in a curved shape in the glass plate, a spring mechanism similar to the fifth embodiment can be provided for each of the pushing pins in the first to fourth embodiments. In the second, third and fourth embodiments shown in FIGS. 4, 9 and 11, a spring mechanism is provided at a side of the holding device for the glass plate to absorb error in a curved shape of the glass plate.

For the pushing means used in the present invention, a projecting slip capable of projecting in an annular shape and a wavy shape from the cavity space may be used for example. Or, a mechanism for connecting the top end portions of the above-mentioned pushing pins with a stripe-like ring may be used.

Further, the present invention is widely applicable not only to a frame-attached glass plate formed by bonding an annular frame to a glass plate but also to a frame-attached transparent plate formed by bonding a frame of predetermined length to a transparent resinous plate having a curved face, and further, the presence or absence of coloring of the transparent plate is also optional.

It is also possible that in timing of pressing the frame to the transparent plate, portions of the frame may be pressed simultaneously or with a difference in time. These are appropriately selected in consideration of the shape of a transparent plate, the shape of parting surfaces of mold and so on. In the following, description will be made as to a relation of timing of pressing the frame to the shape of the transparent plate and the shape of parting surfaces of the mold.

When the transparent plate is curved and the shape of parting surfaces of the mold are flat or nearly flat, the shape of the peripheral portion of the transparent plate is slightly different from the shape of the bonding surface of the frame. Namely, the length of the peripheral portion of the transparent plate to which the frame is bonded is different from the length of the frame. When the lengths of these members are different, a difference between the lengths can be corrected by elongating slightly the frame in a longitudinal direction. Accordingly, in a case that a degree of curving in the transparent plate is not so large, or curved shapes at portions in the peripheral portion of the transparent plate to which the frame is bonded are not so different, it is advantageous to press the frame to the transparent plate while the frame is uniformly stretched. From this viewpoint, it is preferable to press each portion of the frame to the transparent plate simultaneously.

On the other hand, the temperature of the frame just after the molding is at a high temperature level. When a resinous material is stretched in a high temperature state, a stress which will remain in the resinous material after cooling can be reduced. When a curved shape in the peripheral portion of the transparent plate to which the frame is bonded is largely different in each portion, it is effective to press the frame at an early stage, while the frame is stretched, to a portion having a large curvature of the transparent plate. In this case, it is preferable to press portions of the frame to the transparent plate with a difference in time. In considering an extensible characteristic of resin, a direction of projection at each portion of the frame can be in a radial direction.

The number and the position of pushing pins in each of the embodiments of the present invention are determined depending on a shape of the transparent plate. Namely, the frame is pressed in an arched form corresponding to a curved shape of the peripheral portion of the transparent plate. A group of chords formed by top end portion of the pushing pins corresponds to an arched form. By increasing the number of chords, the group of chords approximates an arch. Accordingly, when a curvature of the transparent plate is large (small radius of curvature), it is preferable to increase the number of pushing pins. Further, a curvature of the transparent plate is different depending on portions, it is preferable that pushing pins are arranged densely in a portion having a large curvature, and pushing pins are arranged coasely in a portion having a small curvature.

Description has been made as to why the parting surfaces of the mold are preferably flat or nearly flat.

In the following, description will be made as to a case that the parting surfaces of the mold having a curved shape are advantageous.

It is advantageous to form the parting surfaces of the mold in a curved shape when the transparent plate has a large curvature, in particular, the transparent plate has locally a large curvature. Namely, the transparent plate having a large curvature provides a large difference between the length of the peripheral portion of the transparent plate to which the frame is bonded and the length of the frame. When such difference is large, the difference can not sometimes be absorbed by only the elongation of the resinous material. In this case, the frame can be bonded to the transparent plate having a large curvature by forming a curve in the frame at the time of molding (a curve is formed in the parting surfaces of the mold) without relying on largely the elongation of the resinous material.

It is sometimes insufficient to bond the frame to the transparent plate by simply forming a curve in the frame when the transparent plate has locally a largely curved portion because the portion of the transparent plate having a largely curved portion creates a shrinking function in the resin, whereby there is an action of a force to separate the frame from the transparent plate. It is accordingly preferable to form the frame so that the frame has locally or entirely a larger curve than a degree of curving in the transparent plate. Thus, it is possible to assure a bonding strength of the frame to the transparent plate having a largely curved portion.

In shaping the frame in the present invention, various methods for shaping such as ordinary injection molding, an injection compression molding, a reaction injection molding and so on can be used. Use of the ordinary injection molding is preferred from the viewpoints that the basic structure of the mold can be simplified, a curing time or a reaction time after the molding are unnecessary and so on.

With respect to the color, the material, the shape, the dimension, the style, the number, the arrangement and so on of the transparent plate, the frame, the frame-attached transparent plate, the mold, the pushing means, the pushing pins, the pressing jig and so on exemplified in the above-mentioned embodiments are optional and are not limited thereto as far as the present invention can be achieved.

INDUSTRIAL APPLICABILITY

As described above, according to the method for producing the frame-attached transparent plate of the present invention, the shape in cross section of the frame can optionally be selected. Disadvantages such as a poor dimensional accuracy, a poor bonding strength, a poor appearance of the frame and so on do not create; cost for the mold can be reduced even though the transparent plate has a curved portion, and steps for manufacturing are not complicated.

Further, in the present invention, the frame can certainly and continuously be bonded to a circular arch surface or a spherical surface of the transparent plate by pushing the frame by means of the pushing means which is capable of projecting and retracting with respect to the mold.

Further, in the present invention, the frame can be projected by projecting independently a plurality of pushing pins from the mold. The present invention provides universality of bonding to various types of transparent plate having different curvatures by determining appropriately and separately dimensions of projection of each of the pushing pins.

On the other hand, according to the apparatus used for manufacturing the frame-attached transparent plate according to the present invention, since the mold provided with a large number of pushing pins capable of projecting and retracting wherein the length of projection of the pushing pins can selectively and independently be selected, is used, cost for manufacturing the mold can be reduced and steps of manufacturing the frame-attached transparent plate can be smooth.

We claim:

1. A method for producing a frame-attached transparent plate formed by bonding a frame to a peripheral portion of a surface of a transparent plate, the method comprising the steps of:

injecting a resinous material into a cavity space formed in a mold, which has a shape corresponding substantially to the shape of a frame, to form the frame;

opening the mold to expose outside at least a surface to be bonded to the transparent plate, of the frame;

arranging the transparent plate to oppose to the frame;

projecting the frame from the mold so as to correspond to a curved shape formed in a peripheral portion of the transparent plate to thereby press the frame to a single surface of the transparent plate; and bonding the frame onto the peripheral portion of the transparent plate.

2. The method for producing a frame-attached transparent plate according to claim 1, wherein the mold has a pushing means to be projected and retracted with respect to parting surfaces of the mold and the frame is projected by means of the pushing means.

3. The method for producing a frame-attached transparent plate according to claim 2, wherein a plurality of pushing pins are projected independently from the mold to project the frame.

4. The method for producing a frame-attached transparent plate according to claim 2, wherein the parting surfaces of the mold are maintained in a horizontal state, and the frame is projected in a vertical direction.

5. The method for producing a frame-attached transparent plate according to claim 3, wherein the parting surfaces of the mold are maintained in a horizontal state, and the frame is projected in a vertical direction.

6. The method for producing a frame-attached transparent plate according to claim 4, wherein the transparent plate is arranged above the frame to oppose to it, and the frame is projected upward.

7. The method for producing a frame-attached transparent plate according to claim 5, wherein the transparent plate is arranged above the frame to oppose to it, and the frame is projected upward.

8. The method for producing a frame-attached transparent plate according to claim 1, wherein the transparent plate has a curved shape and portions of the frame are pushed so that each value obtained by subtracting a constant value from a distance of projection at each portion of the frame opposing a corresponding peripheral portion of the transparent plate, is made in agreement with a distance between a face formed by each chord corresponding to each arch in a peripheral portion of the transparent plate and the each corresponding portion of the transparent plate.

9. The method for producing a frame-attached transparent plate according to claim 2, wherein the transparent plate has a curved shape and portions of the frame are pushed so that each value obtained by subtracting a constant value from a distance of projection at each portion of the frame opposing a corresponding peripheral portion of the transparent plate, is made in agreement with a distance between a face formed by each chord corresponding to each arch in a peripheral portion of the transparent plate and the each corresponding portion of the transparent plate.

10. The method for producing a frame-attached transparent plate according to claim 3, wherein the transparent plate has a curved shape and portions of the frame are pushed so that each value obtained by subtracting a constant value from a distance of projection at each portion of the frame opposing a corresponding peripheral portion of the transparent plate, is made in agreement with a distance between a face formed by each chord corresponding to each arch in a peripheral portion of the transparent plate and the each corresponding portion of the transparent plate.

11. The method for producing a frame-attached transparent plate according to claim 4, wherein the transparent plate has a curved shape and portions of the frame are pushed so that each value obtained by subtracting a constant value from a distance of projection at each portion of the frame opposing a corresponding peripheral portion of the transparent plate, is made in agreement with a distance between a face formed by each chord corresponding to each arch in a peripheral portion of the transparent plate and the each corresponding portion of the transparent plate.

12. The method for producing a frame-attached transparent plate according to claim 6, wherein the transparent plate has a curved shape and portions of the frame are pushed so that each value obtained by subtracting a constant value from a distance of projection at each portion of the frame opposing a corresponding peripheral portion of the transparent plate, is made in agreement with a distance between a face formed by each chord corresponding to each arch in a peripheral portion of the transparent plate and the each corresponding portion of the transparent plate.

13. The method for producing a frame-attached transparent plate according to claim 1, wherein the transparent plate has a curved shape, and a concave surface of the curved shape is directed opposing to the frame.

14. The method for producing a frame-attached transparent plate according to claim 1, wherein a preliminary bonding is conducted by pressing the projected frame to a surface of the transparent plate, and a primary bonding of the frame to the transparent plate is conducted by pressing the preliminarily bonded frame to the transparent plate.

15. An apparatus comprising a mold for a frame-attached transparent plate, which has a cavity space having a shape corresponding substantially to the shape of a frame to be attached to a peripheral portion of a surface of a transparent plate and into which a resinous material is injected to form the frame, the apparatus used for producing a frame-attached transparent plate being characterized in that a large number of pushing pins are arranged with predetermined intervals along a continuing direction of the frame so as to be projected and retracted with respect to parting surfaces of the mold wherein the pushing pins are disposed so that they press the frame toward the transparent plate when the mold is opened so that the transparent plate is opposed to the frame, and that a length of projection of each of the pushing pins can be selected.

16. The apparatus according to claim 15, wherein the length of projection of each of the pushing pins can be selected depending on a curved shape of the peripheral portion of the transparent plate.

17. The apparatus according to claim 15, which further comprises a transparent plate transferring/holding device which opposes the transparent plate to the frame in a state of the mold opened.

18. An apparatus comprising:
- a mold for a frame-attached transparent plate, the mold defining a cavity space having a shape corresponding substantially to the shape of a frame to be attached to a peripheral portion of a surface of the frame-attached transparent plate, the cavity space being configured to receive an injection of a resinous material to form the frame; and
- a plurality of pushing pins arranged in predetermined intervals along the frame and configured to be projected and retracted with respect to parting surfaces of the mold, wherein the pushing pins are configured to press the frame toward the transparent plate when the mold is opened so that the transparent plate is opposed to the frame, and wherein a length of projection of each of the plurality of pushing pins can be selected.

19. The apparatus according to claim 18, wherein the length of projection of each of the plurality of pushing pins is selected depending on a curved shape of the peripheral portion of the transparent plate.

20. The apparatus according to claim 18, further comprising a transparent plate transferring/holding device opposite the transparent plate to the frame when the mold is in an opened state.

* * * * *

Disclaimer

6,143,347—James H. Keithly, Bradenton; Harold Pollack, St. Petersburg; Thomas Taggart, Bradenton, all of Fla. EARLY SEASON NOT FROM CONCENTRATE ORANGE JUICE AND PROCESS OF MAKING. Patent dated Nov. 07, 2000. Disclaimer filed Oct. 22, 2007, by the assignee, Tropicana Products, INC.

Hereby enters this disclaimer to all claims of said patent.

*(Official Gazette December 25, 2007)*